United States Patent [19]

Tuulos

[11] Patent Number: 5,842,136
[45] Date of Patent: Nov. 24, 1998

[54] ADDING AND REMOVING SUBSCRIBERS IN AN ONGOING CALL

[75] Inventor: Martti Tuulos, Tampere, Finland

[73] Assignee: Nokia Telecommunications Oy, Espoo, Finland

[21] Appl. No.: 532,660

[22] PCT Filed: Feb. 15, 1995

[86] PCT No.: PCT/FI95/00071

§ 371 Date: Dec. 27, 1995

§ 102(e) Date: Dec. 27, 1995

[87] PCT Pub. No.: WO95/23475

PCT Pub. Date: Aug. 31, 1995

[30] Foreign Application Priority Data

Feb. 16, 1994 [FI] Finland .................................. 940720

[51] Int. Cl.⁶ ................................................. H04Q 7/22
[52] U.S. Cl. ........................ 455/519; 455/517; 455/416
[58] Field of Search ................................ 455/34.1, 34.2, 455/54.1, 54.2, 56.1, 15, 16, 17, 414, 416, 455, 516, 517, 518, 519, 520, 524; 379/202–205, 63

[56] References Cited

U.S. PATENT DOCUMENTS

| | | | |
|---|---|---|---|
| 4,649,567 | 3/1987 | Childress | 379/63 |
| 5,224,094 | 6/1993 | Maher | 379/205 |
| 5,369,783 | 11/1994 | Childress et al. | 455/56.1 |
| 5,373,549 | 12/1994 | Bales et al. | 379/93 |
| 5,473,605 | 12/1995 | Grube et al. | 455/54.1 |

FOREIGN PATENT DOCUMENTS

| | | |
|---|---|---|
| 604053 | 6/1994 | European Pat. Off. . |
| 2 281 676 | 3/1995 | United Kingdom ............. H04Q 7/22 |
| 89/06078 | 6/1989 | WIPO . |

OTHER PUBLICATIONS

MPT 1327, "A Signalling Standard for Trunked Private Land Mobile Radio Systems", Jan. 1988, p. 11–5.

Primary Examiner—Reinhard J. Eisenzopf
Assistant Examiner—Lester G. Kincaid
Attorney, Agent, or Firm—IP Group of Pillsbury Madison & Sutro LLP

[57] ABSTRACT

A method and telecommunication system for controlling a call in a telecommunication system, which comprises a telecommunication network and a first subscriber station and one or more other subscriber stations, in which method is maintained a call in which the subscriber stations participate. In the method of the invention, to remove the desired subscriber stations from the call, the first subscriber station instructs the telecommunication network to remove one or more other subscriber stations from the call, and the telecommunication network removes one or more other subscriber stations from the call without the call being interrupted. In particular, upon issuance of an addition message containing subscriber IDs, the system adds any identified subscriber not yet participating in the call and removes any identified subscriber already participating in the call.

9 Claims, 5 Drawing Sheets

ADDING AND REMOVING SUBSCRIBERS IN AN ONGOING CALL

This application claims benefit of international application PCT FI95/00071, filed Feb. 15, 1995.

FIELD OF THE INVENTION

The present invention relates to a method for controlling a call in a telecommunication system, which comprises a telecommunication network and a first subscriber station and one or more other subscriber stations, this method comprising the step of maintaining a call in which the subscriber stations participate.

BACKGROUND OF THE INVENTION

It is typical of telecommunication networks that calls which involve at least two parties are established. It may thus occur that one party of the call would like to change the group of the subscribers who participate in the call or telecommunication connection concerned.

The subscriber station which has the most need to change the group of the subscriber stations participating in the call is often a dispatcher controlling the telecommunication connection or call, or a fixed control point. This type of situation is typical of the PMR networks (PMR=Private Mobile Radio), in which the dispatcher communicates with the work groups by using different calls, group calls, conference calls and individual calls.

In calls of this type, the dispatcher often has a need to change the number and group of the subscribers participating in a call. Group calls are thus particularly concerned, the dispatcher desiring to change the group of the subscriber stations participating therein even to a considerable degree. A group call is a call in which the system, for instance its dispatcher, or some subscriber station, instructs several, at least three, subscriber stations to join the same call by a single command. The groups are formed from the members of a company or some other user organization, and the groups are often programmed into a radio telephone, the exchange not necessarily knowing which mobile stations belong to which group. Typically, one telephone can belong to several groups.

Among the above-mentioned types of calls, only the conference call is one to which a caller, i.e. for instance a person who has started the call or a dispatcher supervising the call, can add new subscribers without setting up a new call. In connection with any type of call, it is not possible to reduce the number of the participants in a call without releasing the call entirely or partly. Thus, if some subscriber station, for instance the dispatcher, desires to reduce the number of the subscriber stations participating in a call, typically a group call, the only possibility for the dispatcher is to release the entire call. The release of a call causes the problem that the resources used, for instance radio channels and switching apparatuses, are lost at least for a moment, during which time these resources may end up in some other use in another call if the traffic is heavy. Thus, the caller, for instance the dispatcher, is not able to enter smoothly into communication with the desired smaller group.

To avoid this disappointment, the caller has to maintain the call with the larger group for an unnecessarily long time in the prior art solutions, thus wasting the resources. On the other hand, a particular subscriber station, for instance the dispatcher, may desire to inform a smaller group quickly of something that the dispatcher does not want the larger group to know about. The implementation of this, too, is made more difficult if that particular subscriber station has to release the call first and set up a new call, for which resources cannot necessarily be found.

SUMMARY OF THE INVENTION

The object of the present invention is to provide a solution for the problems associated with the prior art solutions. More accurately, the object of the invention is to provide a method and a system by means of which a subscriber station, for instance a dispatcher, participating in a telecommunication connection can, if it so desires, change, or more particularly, reduce, the group of the subscriber stations participating in the call.

This new type of method for controlling a call in a telecommunication system is achieved with the method of the invention, characterized in that the first subscriber station instructs the telecommunication network to remove a desired subscriber station or group call group from the call by transmitting a removal message to the telecommunication network, this removal message comprising the identifier of the subscriber station or group call group to be removed from the call, and that the telecommunication network removes the desired subscriber station or group call group from the group call without the group call being interrupted.

The invention also relates to a method for controlling a call in a telecommunication system, which comprises a telecommunication network, which includes a database and a first subscriber station provided with identifiers and one or more other subscriber stations provided with identifiers, the method comprising the steps of maintaining a call in which the subscriber stations participate and maintaining the identifiers of the subscribers participating in the call in the database of the telecommunication network. This method is characterized in that the first subscriber station transmits an addition message including the identifier of one or more other subscriber stations, this addition message instructing the telecommunication network to add one or more other subscribers to the call; in response to the addition message, the identifiers of one or more other subscriber stations included in the addition message are compared with the identifiers of the subscriber stations participating in the call, these identifiers being maintained in the database, and if the identifiers are the same, those subscriber stations the identifiers of which are included in the addition message are removed from the call.

The invention further relates to a method for controlling a call in a telecommunication system, which comprises a telecommunication network, which includes a database and a first subscriber station provided with identifiers and one or more other subscriber stations provided with identifiers, this method comprising the steps of maintaining a call in which the subscriber stations participate and maintaining the identifiers of the subscribers participating in the call in the database of the telecommunication network. This method of the invention is characterized in that the first subscriber station transmits an addition message including the identifier of one or more other subscriber stations, this addition message instructing the telecommunication network to add one or more other subscribers to the call; in response to the addition message, the identifiers of one or more other subscriber stations included in the addition message are compared with the identifiers of the subscriber stations participating in the call, these identifiers being maintained in the database, and if the identifiers are the same, those subscriber stations the identifiers of which are not included in the addition message are removed from the call.

The invention further relates to a telecommunication system, which comprises a telecommunication network and a first subscriber station participating in a call and one or more other subscriber stations. The telecommunication system of the invention is characterized in that the telecommunication network comprises means responsive to the first subscriber station for removing one or more other subscriber stations participating in the call from the call.

The invention is based on the idea that a first subscriber station, for instance the dispatcher, instructs the telecommunication network to remove the desired other subscriber stations from the call, and the telecommunication network performs this. The subscribers can be removed for instance in such a manner that the first subscriber station transmits a removal message, in response to which the telecommunication network removes the desired subscriber stations from the call.

Even in the present-day systems, a call can be extended by adding new subscribers thereto, for instance where conference calls are concerned. This is achieved in such a manner that a caller transmits an addition message to the telecommunication system, for instance to the PMR radio system, in response to which addition message the system adds the desired subscriber station to the existing call.

To reduce a call, the systems in accordance with the prior art do not comprise corresponding signalling, but it can be defined or implemented in such a manner that the system interprets the addition message to mean that a desired subscriber station is to be removed from the call when the subscriber station which the addition message refers to is already participating in said call. It should be emphasized that the subscriber station to be added can be either an individual subscriber or a group call group. In connection with reducing, the signalling thus remains similar as compared with adding.

The advantage of this type of method for controlling a call in a telecommunication system and of the telecommunication system is that it solves the problems associated with the systems of the prior art, i.e. it provides a possibility to reduce the group of the subscriber stations participating in a call, typically a group call, in a manner desired by the subscriber station controlling the call, the first subscriber station or the dispatcher.

The invention has the advantage that by means thereof, a subscriber station, for instance the dispatcher, is quickly able to direct even a large group call to a small core group in operations that require high quickness. The first subscriber station, which controls the call, can be certain that the reduction of the call will be successful, without the call being interrupted, because the resources which the smaller group needs are already reserved for the original larger group, and it is not necessary to give them away in the interim as in the prior art.

The invention also has the advantage that by means of this new method together with the already existing extension methods of a call, a caller has the possibility to direct, or "zoom", or her call to a desired group very flexibly. The dispatcher can thus, if he or she so desires, exclude from the call such subscriber stations to which he or she does not want to give some information intended for a smaller group.

Furthermore, the invention has the advantage that the method and system according to it enable fast communication simultaneously between several groups while saving, however, the resources used, for instance radio channels. Typically, the dispatcher, who is using the radio telephone network and who controls several different work groups in the field benefits from the method.

BRIEF DESCRIPTION OF THE FIGURES

In the following, the invention will be described in more detail with reference to the accompanying drawings, in which.

DETAILED DESCRIPTION OF THE PREFERRED EMBODIMENTS OF THE INVENTION

With regard to the method, it is irrelevant whether the subscriber stations are fixed wire-connected telephones or radio telephones, and whether the telecommunication network, i.e. the telecommunication infrastructure, is a radio telephone system or a fixed telephone network or some other telecommunication network.

In the MPT radio telephone system, for instance, the removal message required by the method is produced with an RQS message transmitted on the traffic channel, the IDENT1 field including the number (C) of the subscriber or group to be removed. One operating according to the MPT standard should thus interpret this message as a "remove"-message if the subscriber or group the identifier of which is C is already participating in the same call with the transmitter of this message.

The implementation of the method can vary freely as concerns the removal message and as to how the system infrastructure removes redundant subscribers from the call after receiving the removal message.

The MPT signalling mentioned in the example has been defined in the document "MPT 1327, A Signalling Standard for Trunked Private Land Mobile Radio Systems, January 1988, revised and reprinted November 1991", chapter 11.2.1. in particular.

Figure 1:
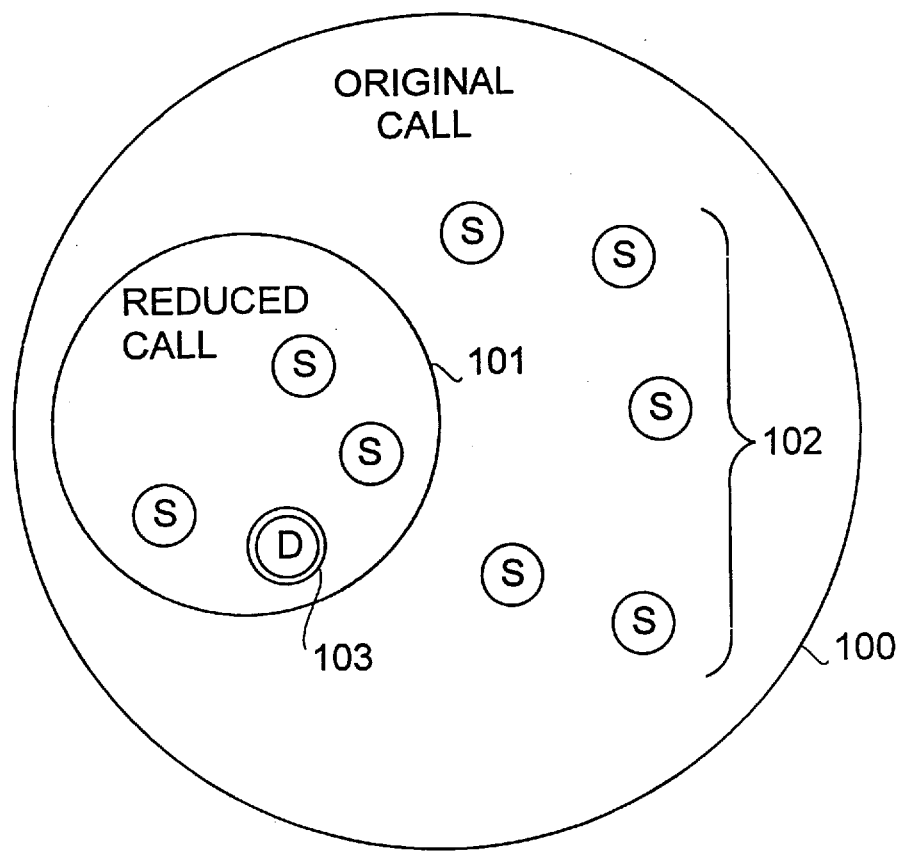
FIG. 1 is a schematic representation of the application of the method of the invention in a situation including an original call, and a reduced call comprising fewer subscribers.

FIG. 1 is a schematic representation of the application of the method of the invention in a situation including an original call 100, and a reduced call 101 comprising fewer subscribers. Subscriber stations S are shown in connection with both calls. In addition, the figure comprises "a first subscriber station", i.e. a subscriber station D, which commands the telecommunication network to remove a certain group 102 of the subscriber stations S from the original call. This first subscriber station is, for instance, the dispatcher controlling a group call. When the dispatcher (around whom there is a double circle in FIGS. 1 and 2) has reduced the group of subscribers participating in the call, the original call 100 is reduced to the reduced call 101, in which fewer subscriber stations S participate.

Figure 2:
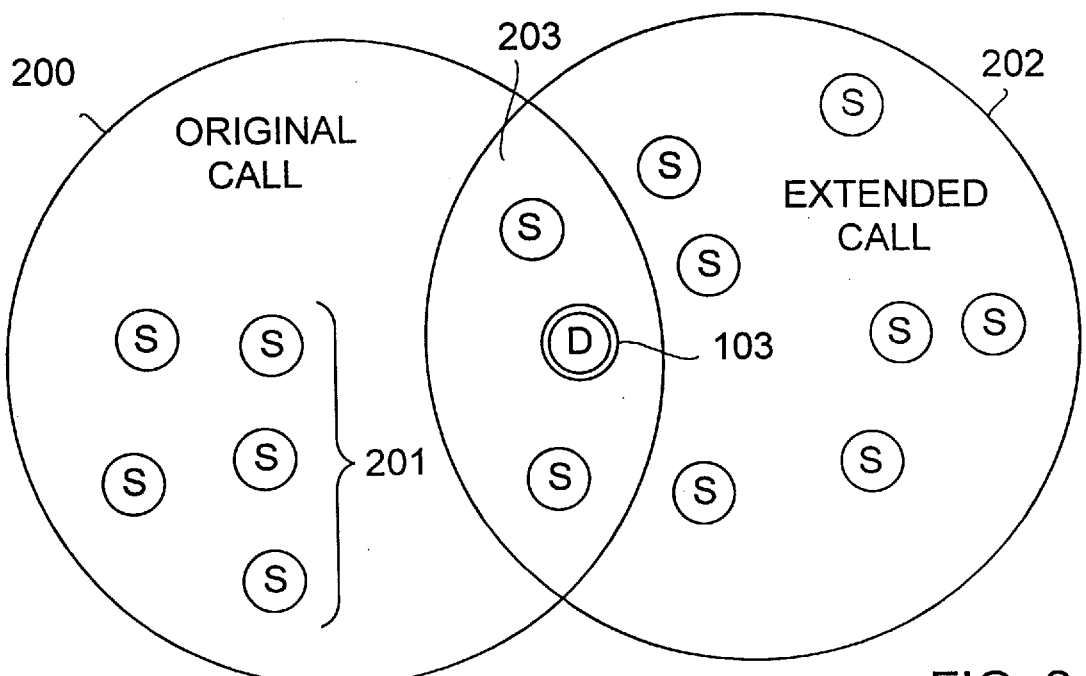
FIG. 2 is a schematic representation of the application of the method of the invention in a situation including an original call and an extended call, in which situation some subscribers have been removed from the original call and in which new subscribers have been added to the extended call.

FIG. 2 is a schematic representation of the application of the method of the invention in a situation including an original call 200, to which a group of subscriber stations S belong. The first subscriber station D, 103 participating in the call, for instance the dispatcher, first commands the telecommunication network to remove a desired group 201 of subscriber stations from the original call 200. Only the first subscriber station D, 103 and some other subscriber stations are retained in the original call, thus forming a subgroup 203. Next, the first subscriber station transmits an addition message to the telecommunication network, in response to which the telecommunication network adds more subscriber stations S to the subgroup 203, an extended call 202 being thus set up. In the extended call, some subscribers 201 have thus been removed from the original call, and new subscribers have been added to the extended call 202.

Figure 3:
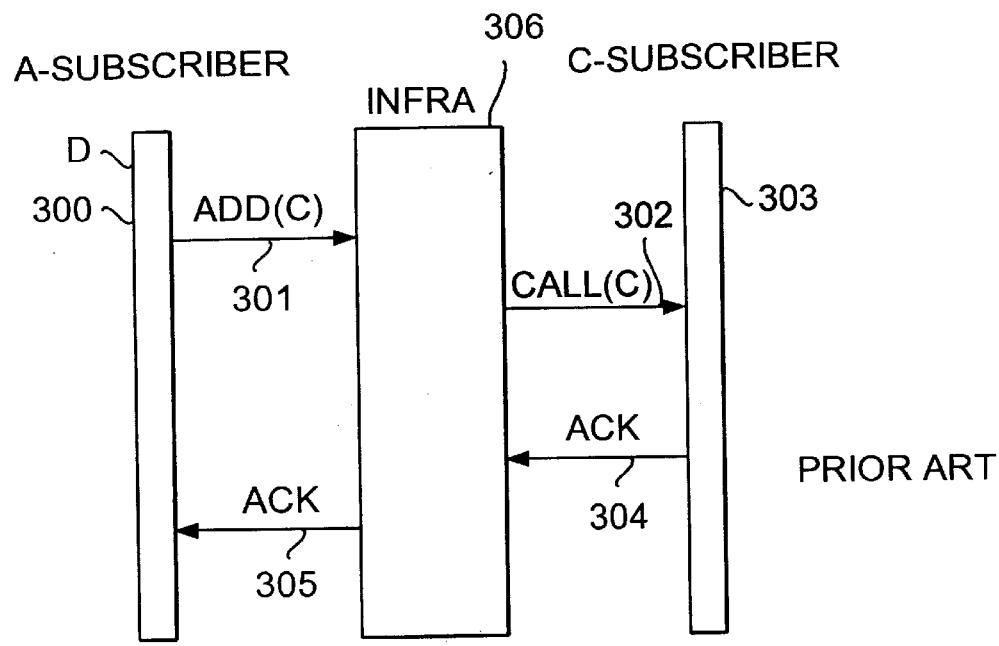
FIG. 3 shows a signalling diagram of a method of the prior art, in which subscribers are added to a call by means of an addition message.

FIG. 3 shows a signalling diagram of a method of the prior art, in which subscribers are added to a call by means of an addition message. In FIG. 3, an A-subscriber 300, D, i.e. the first subscriber station, for instance the dispatcher, transmits an addition message 301 to the telecommunication network 306, Infra, more accurately the infrastructure, which can comprise for instance radio telephone system base stations and switching centres, or telephone network transmission devices and exchanges. The addition message 301 includes the identifier C of the subscriber, subscribers or group call group that is to be added to the call. After this, the telecommunication network transmits a call message 302 to the subscribers 303, C-subscriber, the identifiers C of which were included in the addition message 301. When the called subscribers receive the call messages 302, they transmit an acknowledgement message to the infrastructure Infra, which transmits an acknowledgement message 305 further to the A-subscriber D. At the same time, the C-subscribers join the call, and they are allocated the necessary resources, such as radio channels, transmission links and switching capacity. After having received the acknowledgement message 305, the A-subscriber, 300, D knows that the addition message 301 transmitted by it has reached its destination and that the subscribers who had transmitted their acknowledgement message 304 to the system Infra have joined the call.

Figure 4:
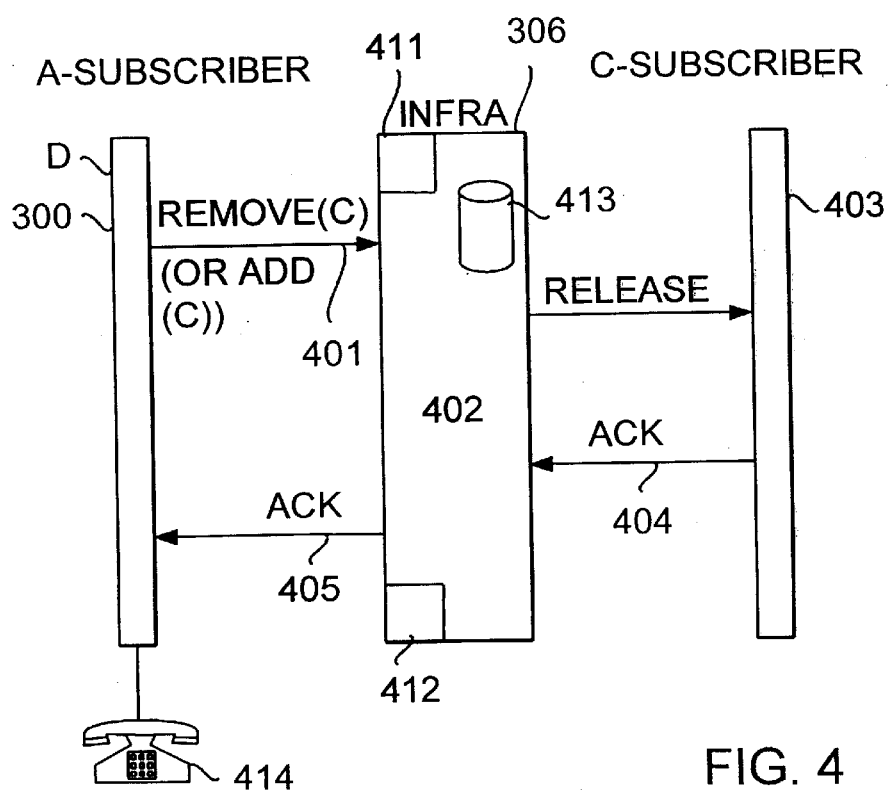
FIG. 4 shows a signalling diagram of the method of the invention, in which desired subscriber stations have been removed from a call by means of a removal message or addition message.
Figure 5:
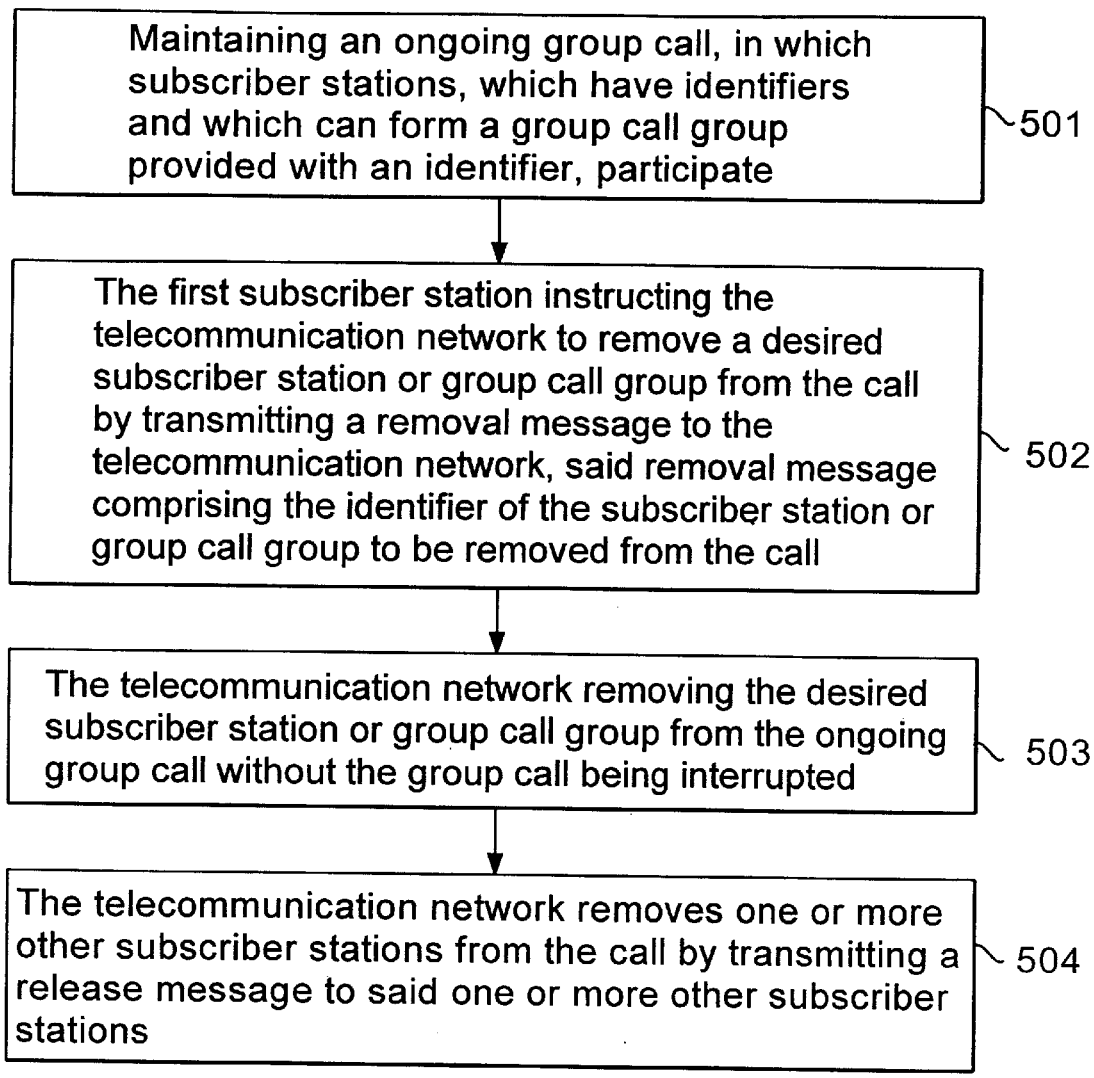
FIG. 5 is a flow chart showing the functioning of the first embodiment of the method.
Figure 6:
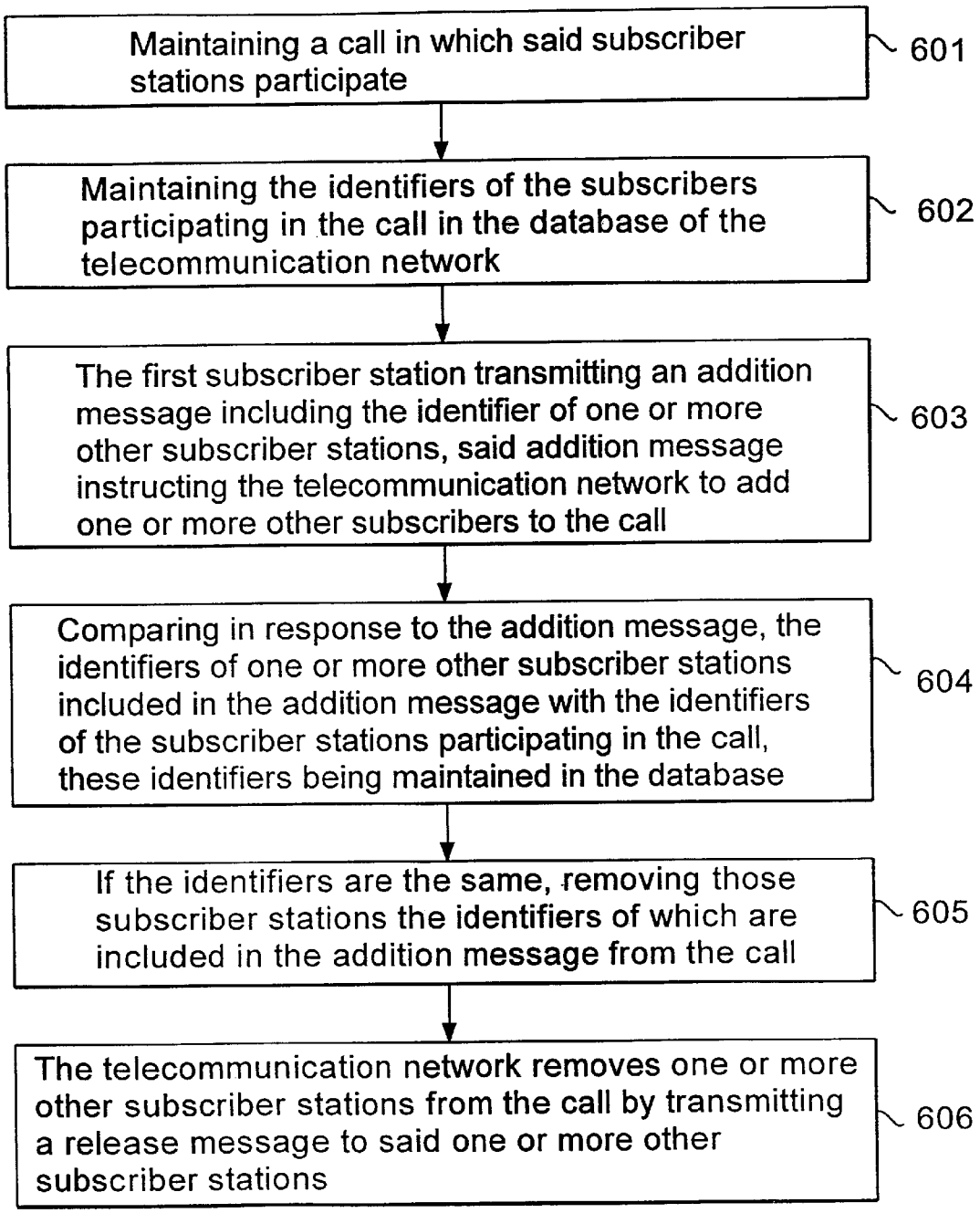
FIG. 6 is a flow chart showing the functioning of the second embodiment of the method.
Figure 7:
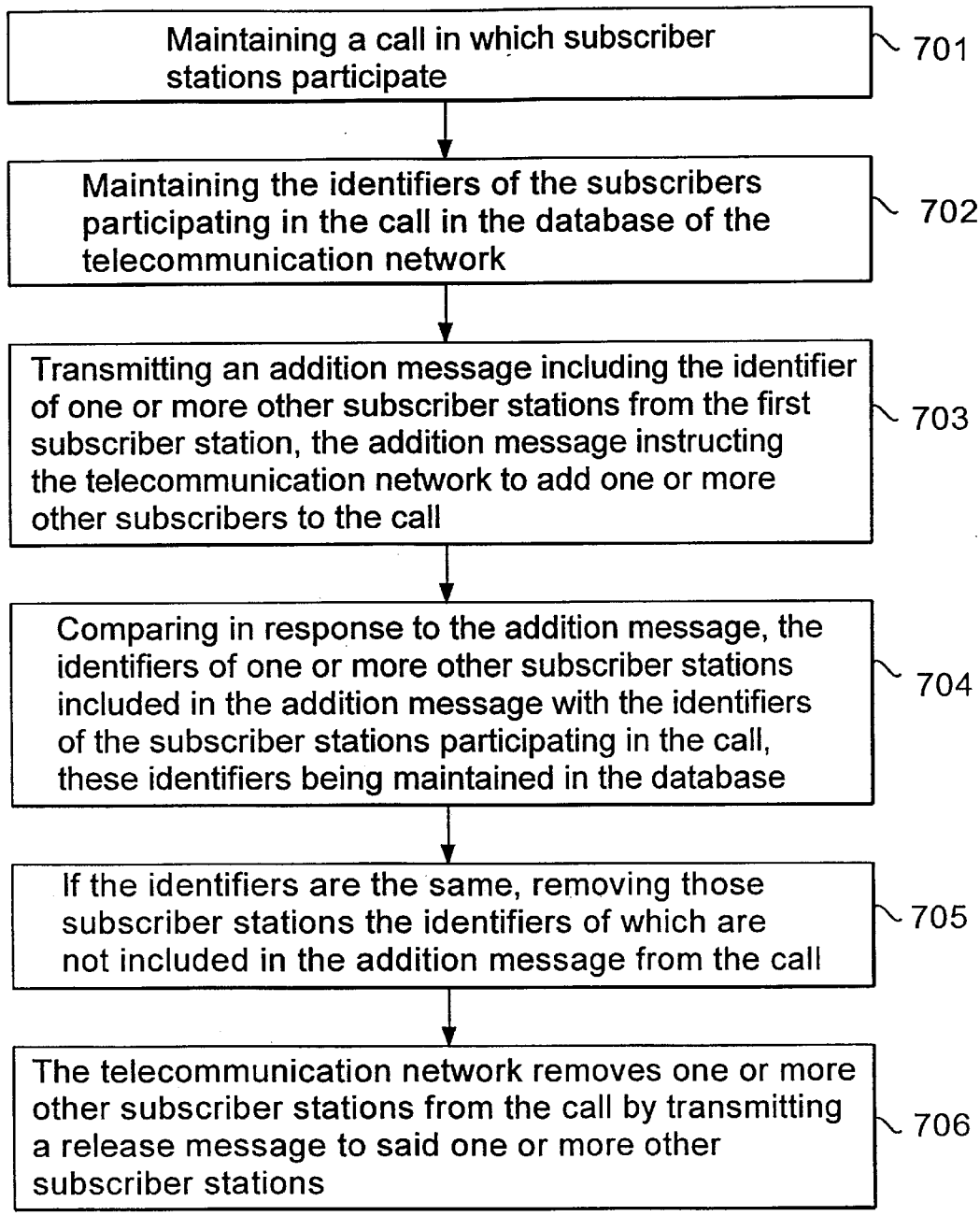
FIG. 7 is a flow chart showing the functioning of the third embodiment of the method.

FIG. 4 shows a signalling diagram of the method of the invention, in which desired subscriber stations have been removed from a call by means of a removal message or addition message. FIG. 5 is a flow chart showing the functioning of the first embodiment of the method; FIG. 6 is a flow chart showing the functioning of the second embodiment of the method; and FIG. 7 is a flow chart showing the functioning of the third embodiment of the method. In FIG. 4, an A-subscriber, 300, D, i.e. the first subscriber station, for instance the dispatcher, belonging to the ongoing group call 501, 601 or 701, transmits, at 502, 603 or 703, transmits a removal message 401 to the telecommunication network Infra. The dispatcher or a fixed control point is indicated in FIG. 4, at 414. The removal message 401 includes the identifier C of the subscriber, subscribers or group call group that is to be removed, at 503, from the existing call. After this, the telecommunication network 306, Infra transmits a removal or release message 402 to the subscribers 403, C-subscriber, the identifiers C of which were included in the removal message 401. When the subscribers 403 to be removed receive the removal or release messages 402, they transmit an acknowledgement message 404 to the infrastructure Infra, which further transmits an acknowledgement message 405 to the A-subscriber D.

It should be pointed out that in a second embodiment of the invention, the removal message 603 may be exactly similar to the addition message, but the telecommunication network reacts to it in a new and inventive manner, i.e. the network or infrastructure compares, at 604, the identifier of the subscriber stations or group call included in the addition message with the identifiers of the subscribers or group calls which participate in the call to which the A-subscriber, the transmitter of the addition message, belongs. Thus, as a result of this comparison, if the identifiers included in the addition message were the same as the identifiers of the subscribers or group calls which participate in the call which the A-subscriber, the transmitter of the addition message, belongs to, the telecommunication network interprets this to mean that the subscriber station D, which had transmitted, at 603, the addition message, desires to remove, at 605, the subscribers mentioned in the addition message from the call by transmitting, at 606, a release message.

In a third embodiment of the invention, the identifiers C of the subscriber stations and group call groups included in the addition message 401, at 703, are compared, at 704, with the identifiers of the subscriber stations participating in the call located and maintained in a database 413 of the infrastructure in response to the addition message 401 in the infrastructure 306, and if the identifiers are the same, those subscriber stations the identifiers of which were not included in the addition message are removed, at 705, from the call, by transmitting , at 706, a release message.

In removal and addition messages, the essential piece of information is the subscriber or group number C which the operation of the message relates to. Other messages, i.e. call message 302, release message 402 and acknowledgement message 404 are system-specific existing messages to call and release a subscriber or group and to express acknowledgements.

The telecommunication network according to the invention, the telecommunication infrastructure 306, Infra, comprises means 411 responsive to the first subscriber station 300, i.e. the A-subscriber, or for instance the dispatcher or supervisor of the system, for removing from the call one or more other subscriber stations (FIG. 1, 102) participating in the call. This removal is performed in the manner described above by transmitting a release message to the desired subscribers.

In the telecommunication system of the invention, said the means 411 responsive to the first subscriber station for removing another subscriber station 102 from the call are responsive to the removal message 401 transmitted by the first subscriber station.

In the telecommunication system of the invention, the means 411 responsive to the first subscriber station for removing another subscriber station from the call are responsive to the addition message transmitted by the first subscriber station. This relates to the second embodiment of the invention.

The telecommunication system of the invention comprises comparing means 412 responsive to the addition message 301 transmitted by the first subscriber station for comparing the identifier C of the subscriber station included in the addition message 301 with the identifiers of the subscriber stations participating in the call stored, at 602 or 702, in the database 413 of the telecommunication network 306, and for removing one or more other subscriber stations 102 from the call on the basis of the comparison.

The figures and the description relating thereto are only intended to illustrate the idea of the invention. In their details, the method of the invention for controlling a call in a telecommunication system and a telecommunication system may vary within the scope of the claims. Even if the invention has been described above primarily in connection with a mobile communication or radio telephone system, the invention can also be used in other types of telecommunication systems, such as conventional telephone networks or intelligent network (IN) applications of such networks.

I claim:

1. A method for controlling a call in a telecommunication system, which comprises a telecommunication network, which includes a database and a first subscriber station provided with identifiers and one or more other subscriber stations provided with identifiers, said method comprising the steps of maintaining a call in which said subscriber stations participate, maintaining the identifiers of the subscribers participating in the call in the database of the telecommunication network, the first subscriber station transmitting an addition message including the identifier of one or more other subscriber stations, said addition message instructing the telecommunication network to add one or more other subscribers to the call, comparing in response to the addition message, the identifiers one or more other subscriber stations included in the addition message with the identifiers of the subscriber stations participating in the call, these identifiers being maintained in the database, and if the identifiers are the same, removing those subscriber stations the identifiers of which are included in the addition message from the call.

2. A method according to claim 1, further comprising:

removing by the telecommunication network of one or more other subscriber stations from the call by transmitting a release message to said one or more other subscriber stations.

3. A method according to claim 1, wherein said identifiers of one or more other subscriber stations comprise the identifier of a group call group.

4. A method according to claim 1, wherein the subscriber station, which instructs the telecommunication network to remove a subscriber station or subscriber stations from the call is a fixed control point.

5. A method for controlling a call in a telecommunication system, which comprises a telecommunication network, which includes a database and a first subscriber station provided with identifiers and one or more other subscriber stations provided with identifiers, said method comprising the steps of maintaining a call in which said subscriber stations participate, maintaining the identifiers of the subscribers participating in the call in the database of the telecommunication network, transmitting an addition message including the identifier of one or more other subscriber stations from the first subscriber station, said addition message instructing the telecommunication network to add one or more other subscribers to the call, comparing in response to the addition message, the identifiers of one or more other subscriber stations included in the addition message with the identifiers of the subscriber stations participating in the call, these identifiers being maintained in the database, and if the identifiers are the same, removing those subscriber stations the identifiers of which are not included in the addition message from the call.

6. A method according to claim 5, further comprising:

removing by the telecommunication network of one or more other subscriber stations from the call by transmitting a release message to said one or more other subscriber stations.

7. A method according to claim 5, wherein said identifiers of one or more other subscriber stations comprise the identifier of a group call group.

8. A method according to claim 5, wherein the subscriber station, which instructs the telecommunication network to remove a subscriber station or subscriber stations from the call is a fixed control point.

9. A telecommunication system, comprising:

a telecommunication network;

a first subscriber station participating in a call; and at least one other subscriber station;

said telecommunication network comprising removing means responsive to said first subscriber station for removing at least one said other subscriber station from participating in said call; and comparing means responsive to an addition message transmitted by the first subscriber station for comparing an identifier of at least one other subscriber station included in the addition message with an identifier of each other subscriber station participating in the call stored in a database, and for removing at least one other subscriber station from the call on the basis of said comparison.

* * * * *